(12) United States Patent
Zhao et al.

(10) Patent No.: US 12,225,201 B2
(45) Date of Patent: Feb. 11, 2025

(54) IMAGE OR VIDEO CODING BASED ON TEMPORAL MOTION INFORMATION IN UNITS OF SUBBLOCKS

(71) Applicant: LG ELECTRONICS INC., Seoul (KR)

(72) Inventors: Jie Zhao, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 326 days.

(21) Appl. No.: 17/617,279

(22) PCT Filed: Jun. 11, 2020

(86) PCT No.: PCT/KR2020/007563
§ 371 (c)(1),
(2) Date: Dec. 7, 2021

(87) PCT Pub. No.: WO2020/251270
PCT Pub. Date: Dec. 17, 2020

(65) Prior Publication Data
US 2022/0232219 A1    Jul. 21, 2022

Related U.S. Application Data

(60) Provisional application No. 62/860,234, filed on Jun. 11, 2019.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11)

(58) Field of Classification Search
CPC .. H04N 19/137; H04N 19/105; H04N 19/132; H04N 19/176; H04N 19/109; H04N 19/119; H04N 19/513
See application file for complete search history.

(56) References Cited

U.S. PATENT DOCUMENTS

2020/0045307 A1* 2/2020 Jang .................... H04N 19/119

FOREIGN PATENT DOCUMENTS

| KR | 101967967 B1 | 4/2019 |
| KR | 20190041480 A | 4/2019 |
| KR | 20190053238 A | 5/2019 |

OTHER PUBLICATIONS

Chen, Chun-chia et al., CE2.5.1: Simplification of SbTMVP. JVET-M0165, Joint Video Experts Team (JVET) of ITU-T SG 16 WP 3 and ISO/IEC JTC 1/SC 29/WG 11, 13th meeting: Marrakech, MA, Jan. 9, 2019 (Year: 2019).*

(Continued)

*Primary Examiner* — Sath V Perungavoor
*Assistant Examiner* — Tyler B Edwards
(74) *Attorney, Agent, or Firm* — Bryan Cave Leighton Paisner LLP

(57) ABSTRACT

According to the disclosure of this document, in subblock-based temporal motion vector prediction (sbTMVP), base motion information for a subblock for which a motion vector is not available can be efficiently derived, and through this, video/image coding efficiency can be improved.

9 Claims, 15 Drawing Sheets

(51) Int. Cl.
H04N 19/132 (2014.01)
H04N 19/176 (2014.01)

(56) References Cited

OTHER PUBLICATIONS

Chun-Chia Chen, et al., "CE2.5.1: Simplification of SbTMVP", Joint Video Experts Team (JVET) of ITU-T SG 16 WP 3 and ISO/IEC JTC 1/SC 29/WG 11, 13th Meeting: Marrakech, MA, Jan. 9-18, 2019. Document: JVET-M0165-v1.

Hahyun Lee, et al., CE2-related: Simplification of subblock-based temporal merging candidates, Joint Video Experts Team (JVET) of ITU-T SG 16 WP 3 and ISO/IEC JTC 1/SC 29/WG 11, 13th Meeting: Marrakech, MA, Jan. 9-18, 2019. Document: JVET-M0240.

* cited by examiner

IMAGE OR VIDEO CODING BASED ON TEMPORAL MOTION INFORMATION IN UNITS OF SUBBLOCKS

CROSS-REFERENCE TO RELATED APPLICATIONS

This application is a National Stage filing under 35 U.S.C. 371 of International Application No. PCT/KR2020/007563, with an international filing date of Jun. 11, 2020, which claims the benefit of U.S. Provisional Application No. 62/860,234, filed on Jun. 11, 2019, all of which are incorporated by reference in their entirety herein.

BACKGROUND OF THE DISCLOSURE

Field of the Disclosure

The present technology relates to video or image coding, and for example, to an image or video coding technology based on temporal motion information in the unit of a subblock.

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

Further, in order to improve image/video coding efficiency, there has been a discussion about temporal motion vector prediction technology in the unit of a subblock. For this, there is a need for schemes to reduce complexity in a process of deriving base motion data used in the temporal motion vector prediction in the unit of a subblock and to improve prediction performance

SUMMARY

An aspect of the present disclosure is to provide a method and an apparatus for enhancing video/image coding efficiency.

Another aspect of the present disclosure is to provide a method and an apparatus for efficient inter prediction.

Still another aspect of the present disclosure is to provide a method and an apparatus for improving prediction performance by deriving a subblock-based temporal motion vector.

Still another aspect of the present disclosure is to provide a method and an apparatus for reducing complexity by efficiently deriving base motion data in deriving a subblock-based temporal motion vector.

Still another aspect of the present disclosure is to provide a method and an apparatus for improving prediction accuracy by applying a motion shift when deriving a temporal motion vector.

According to an exemplary embodiment of the present disclosure, base motion information can be derived with respect to a subblock in which a motion vector is not available in subblock-based temporal motion vector prediction (sbTMVP).

According to an exemplary embodiment of the present disclosure, in deriving base motion information of sbTMVP, one of reference subblocks on a collocated reference picture can be used. For example, the base motion information can be derived based on location information of the reference subblock, or the base motion information can be derived based on whether the reference subblock is available.

According to an exemplary embodiment of the present disclosure, motion information in temporal motion vector prediction (TMVP) can be used as base motion information of sbTMVP instead of additionally deriving the base motion information of the sbTMVP.

According to an exemplary embodiment of the present disclosure, motion information of TMVP can be derived by applying a motion shift based on a spatial neighboring block in a TMVP deriving process.

According to an exemplary embodiment of the present disclosure, a video/image decoding method performed by a decoding apparatus is provided. The video/image decoding method may include a method disclosed in embodiments of the present disclosure.

According to an exemplary embodiment of the present disclosure, a decoding apparatus performing video/image decoding is provided. The decoding apparatus may perform a method disclosed in embodiments of the present disclosure.

According to an exemplary embodiment of the present disclosure, a video/image encoding method performed by an encoding apparatus is provided. The video/image encoding method may include a method disclosed in embodiments of the present disclosure.

According to an exemplary embodiment of the present disclosure, an encoding apparatus performing video/image encoding is provided. The encoding apparatus may perform a method disclosed in embodiments of the present disclosure.

According to an exemplary embodiment of the present disclosure, a computer-readable digital storage medium storing encoded video/image information generated according to a video/image encoding method disclosed in at least one of embodiments of the present disclosure is provided.

According to an exemplary embodiment of the present disclosure, a computer-readable digital storage medium storing encoded information or encoded video/image information causing a decoding apparatus to perform a video/image decoding method disclosed in at least one of embodiments of the present disclosure is provided.

The present disclosure may have various effects. For example, the overall image/video compression efficiency can be enhanced. Further, through the efficient inter prediction, computational complexity can be reduced, and the overall coding efficiency can be improved. Further, by simplifying the base motion information deriving process in the subblock-based temporal motion vector prediction (sbTMVP), the efficiency in complexity and prediction performance can be improved. Further, by applying the motion shift to the temporal motion vector prediction (TMVP), the prediction accuracy can be improved, and by integrating the TMVP and the sbTMVP processes, the efficiency can be improved.

Effects that can be obtained through detailed examples in the description are not limited to the above-mentioned effects. For example, there may be various technical effects that can be understood or induced from the description by a person having ordinary skill in the related art. Accordingly, the detailed effects of the description are not limited to those explicitly described in the description, and may include various effects that can be understood or induced from the technical features of the description.

DESCRIPTION OF EXEMPLARY EMBODIMENTS

Figure 1:
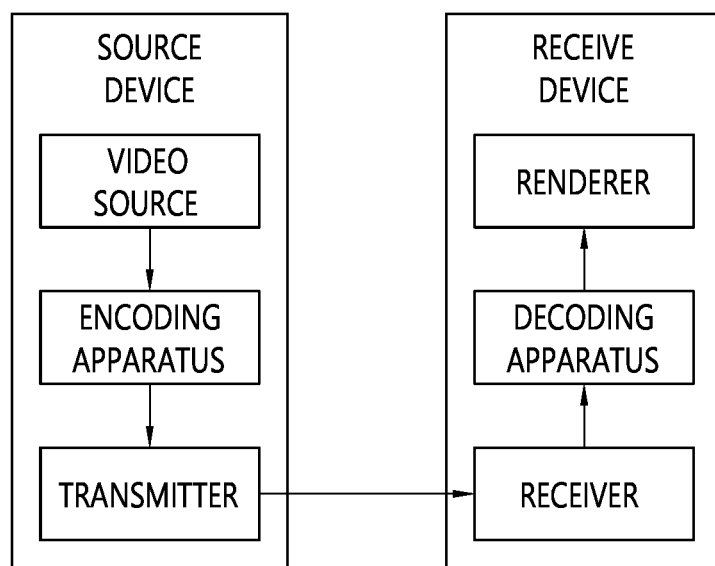
FIG. 1 schematically illustrates an example of a video/image coding system to which embodiments of the present disclosure are applicable.

The present disclosure may be modified in various ways and may have various embodiments, and specific embodiments will be illustrated in the drawings and described in detail. However, this does not intend to limit the present disclosure to the specific embodiments. Terms commonly used in this specification are used to describe a specific embodiment and is not used to limit the technical spirit of the present disclosure. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in the present disclosure are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of the present disclosure unless it deviates from the essence of the present disclosure.

In the present disclosure, the term "A or B" may mean "only A", "only B", or "both A and B". In other words, in the present disclosure, the term "A or B" may be interpreted to indicate "A and/or B". For example, in the present disclosure, the term "A, B or C" may mean "only A", "only B", "only C", or "any combination of A, B and C".

A slash "/" or a comma used in the present disclosure may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B", or "both A and B". Further, in the present disclosure, the expression "at least one of A or B" or "at least one of A and/or B" may be interpreted the same as "at least one of A and B".

Further, in the present disclosure, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present disclosure may mean "for example". Specifically, in the case that "prediction (intra prediction)" is expressed, it may be indicated that "intra prediction" is proposed as an example of "prediction". In other words, the term "prediction" in the present disclosure is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

The present disclosure relates to video/image coding. For example, the methods/embodiments disclosed in the present disclosure may be applied to a method disclosed in the versatile video coding (VVC). Further, the methods/embodiments disclosed in the present disclosure may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

The present disclosure presents various embodiments of video/image coding, and the embodiments may be performed in combination with each other unless otherwise mentioned.

In the present disclosure, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an MxN block may include samples (or sample arrays) or a set (or array) of transform coefficients of M columns and N rows.

Also, in the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In the present disclosure, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of the present disclosure as well.

In the present disclosure, technical features individually explained in one drawing may be individually implemented, or may be simultaneously implemented.

Hereinafter, preferred embodiments of the present disclosure are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of the present disclosure may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
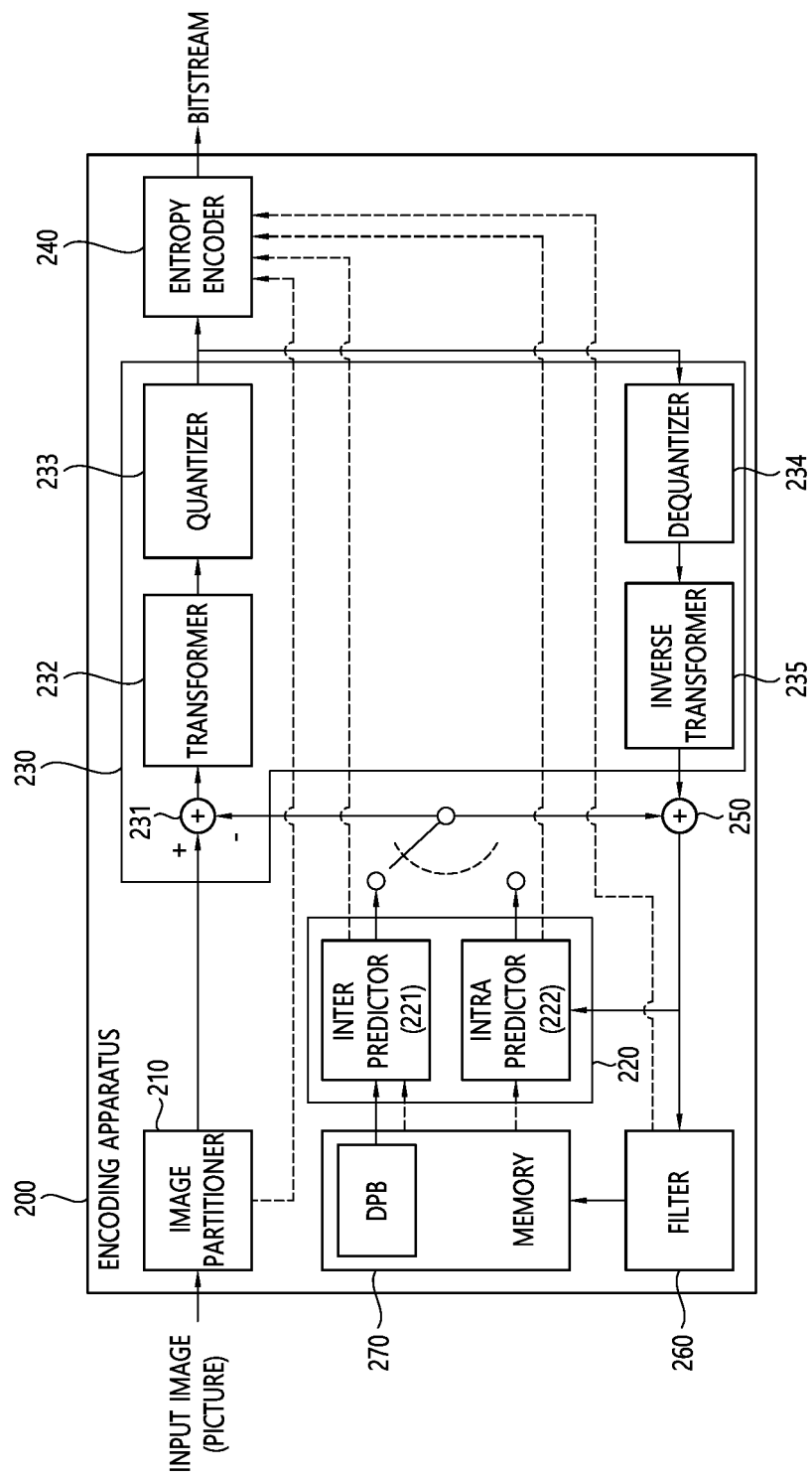
FIG. 2 is a diagram schematically explaining the configuration of a video/image encoding apparatus to which embodiments of the present disclosure are applicable.

FIG. 2 is a schematic diagram illustrating a configuration of a video/image encoding apparatus to which the embodiment(s) of the present disclosure may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a predictor (PU) or a transformer (TU). In this case, the predictor and the transformer may be split or partitioned from the aforementioned final coding unit. The predictor may be a unit of sample prediction, and the transformer may be a unit for deriving a transform coefficient and/or a unit for deriving a residual signal from the transform coefficient.

The unit may be used interchangeably with terms such as block or area in some cases. In a general case, an MxN block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
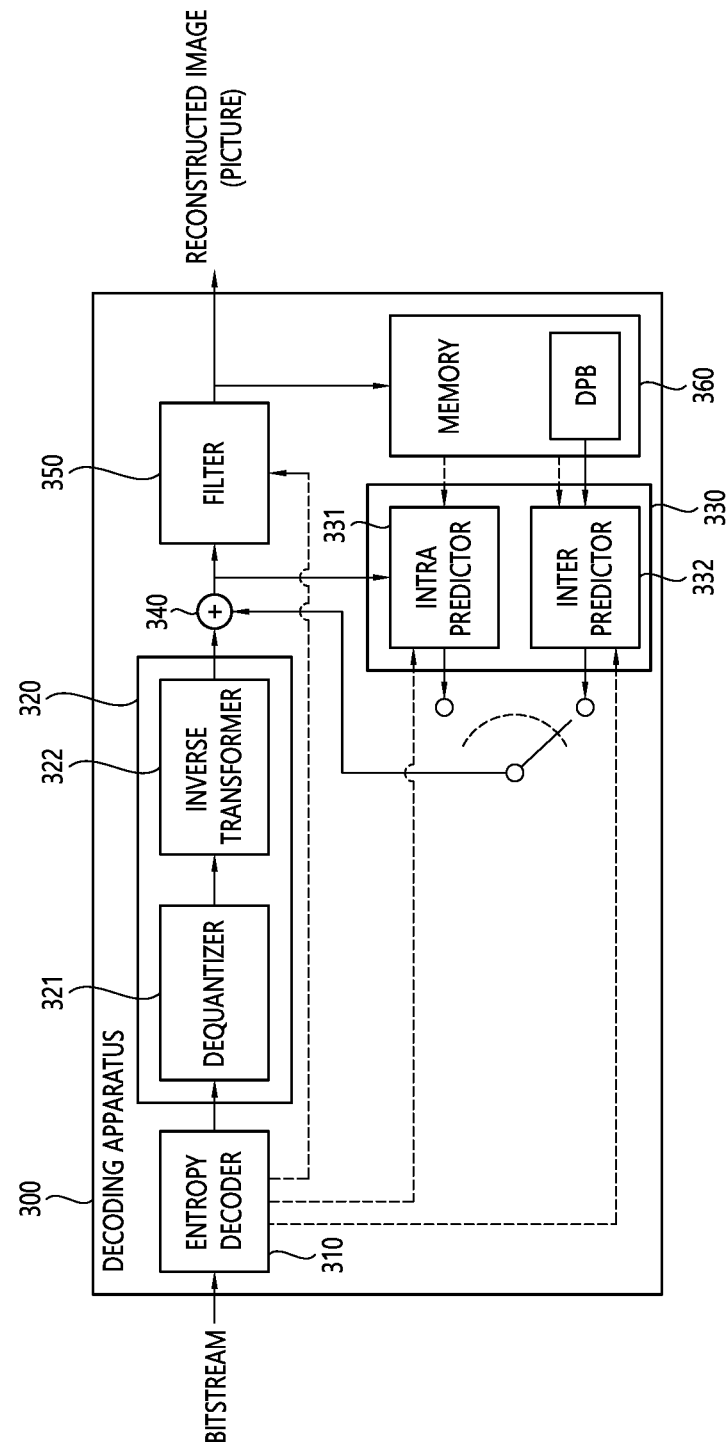
FIG. 3 is a diagram schematically explaining the configuration of a video/image decoding apparatus to which embodiments of the present disclosure are applicable.

FIG. 3 is a schematic diagram illustrating a configuration of a video/image decoding apparatus to which the embodiment(s) of the present disclosure may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transformers may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain) The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, as described above, the intra prediction or inter prediction may be applied when performing the prediction on the current block. Hereinafter, a case of applying the inter prediction to the current block will be described.

The predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present disclosure, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, when inter prediction is applied to the current block, motion information of the current block may be used. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average of prediction samples derived based on the L0 prediction (i.e., a prediction using a reference picture in the reference picture list L0 and MVL0) and prediction samples (according to a phase) derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Figure 4:
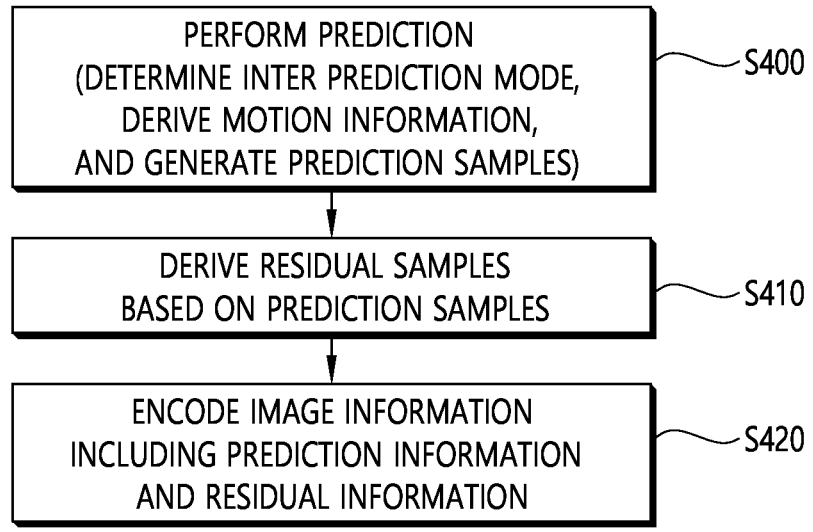
FIG. 4 illustrates an example of an inter prediction-based video/image encoding method, and FIG. 5 schematically illustrates an example of an inter predictor in an encoding apparatus.
Figure 5:
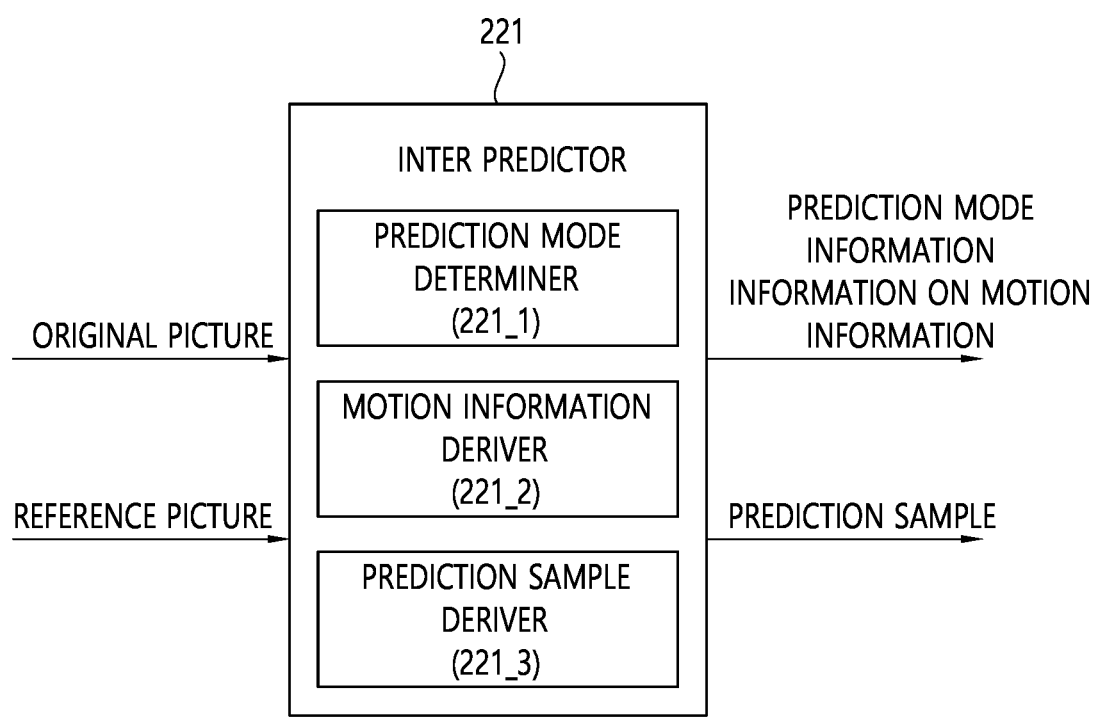

FIG. 4 illustrates one example of a video/image encoding method based on an inter prediction and FIG. 5 illustrates one example schematically illustrating an inter-predictor in an encoding apparatus. The inter predictor in the encoding apparatus of FIG. 5 may also be applied to be the same as or correspond to the inter predictor 221 of the encoding apparatus 200 of FIG. 2.

Referring to the FIGS. 4 and 5, the encoding apparatus performs the inter prediction for the current block (S400). The encoding apparatus may derive the inter prediction mode and the motion information of the current block and generate the prediction samples of the current block. Here, an inter prediction mode determining procedure, a motion information deriving procedure, and a generation procedure of the prediction samples may be simultaneously performed and any one procedure may be performed earlier than other procedures.

For example, the inter predictor 221 of the encoding apparatus may include a prediction mode determiner 221_1, a motion information deriver 221_2, and a prediction sample deriver 221_3, and the prediction mode determiner 221_1 may determine the prediction mode for the current block, the motion information deriver 221_2 may derive the motion information of the current block, and the prediction sample deriver 221_3 may derive the prediction samples of the current block. For example, the inter predictor 221 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding device may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding device. The motion information of the current block may be derived by using the motion information of the selected merge candidate.

As another example, when an (A)MVP mode is applied to the current block, the encoding device may configure an (A)MVP candidate list and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding device or transferred to the decoding device via the network.

Meanwhile, as described above, the encoding device may generate a reconstructed picture (including reconstructed samples and reconstructed blocks) based on the reference samples and the residual samples. This is to derive the same prediction result as that performed by the decoding device, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering procedure may be further applied to the reconstruction picture as described above.

Figure 6:
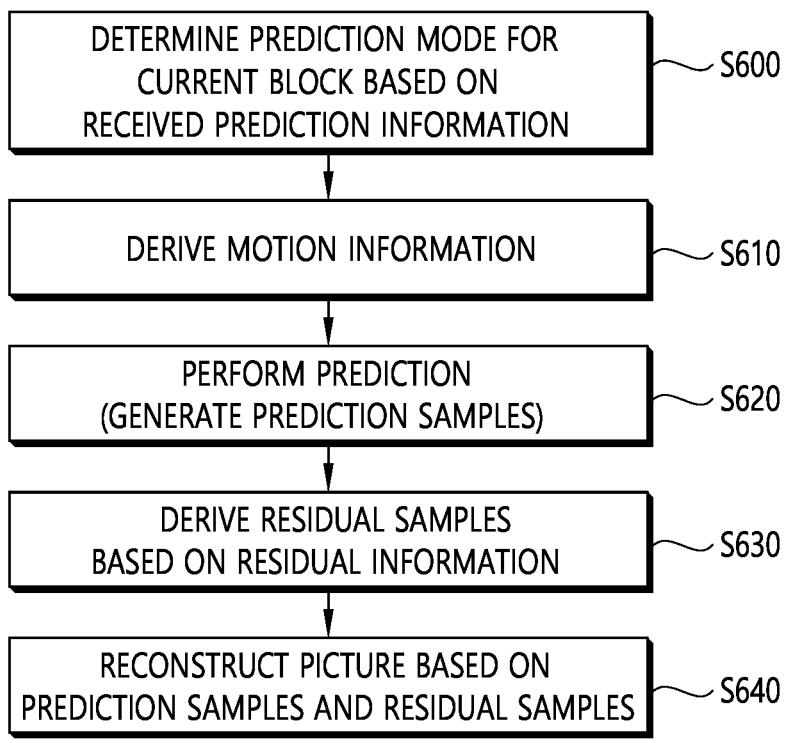
FIG. 6 illustrates an example of an inter prediction-based video/image decoding method, and FIG. 7 schematically illustrates an example of an inter predictor in a decoding apparatus.
Figure 7:
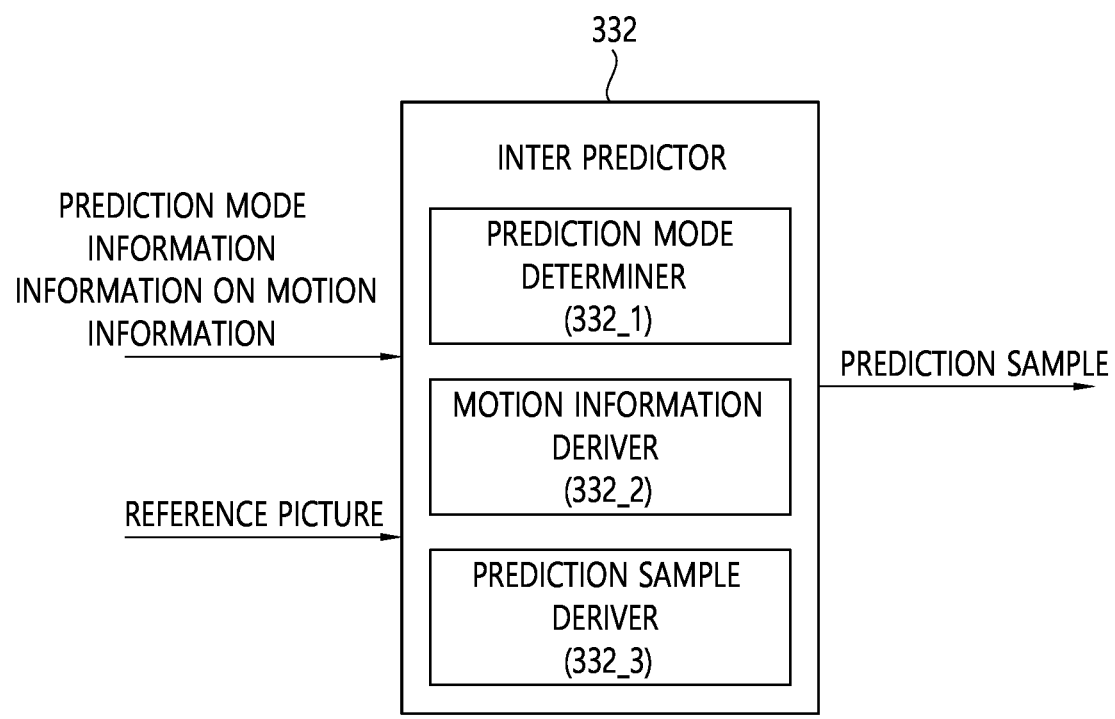

FIG. 6 illustrates one example of a video/image decoding method based on an inter prediction and FIG. 7 illustrates one example schematically illustrating an inter predictor in a decoding apparatus. The inter predictor in the decoding apparatus of FIG. 7 may also be applied to be the same as or correspond to the inter predictor 332 of the decoding apparatus 300 of FIG. 3.

Referring to FIGS. 6 and 7, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S600). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes described above.

The decoding apparatus derives the motion information of the current block based on the determined inter prediction mode (S610). For example, when the skip mode or the merge mode is applied to the current block, the decoding device may configure the merge candidate list and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S620). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter predictor 332 of the decoding apparatus may include a prediction mode determiner 332_1, a motion information deriver 332_2, and a prediction sample deriver 332_3, and the prediction mode determiner 332_1 may determine the prediction mode for the current block based on the received prediction mode information, the motion information deriver 332_2 may derive the motion information (the motion vector and/or reference picture index) of the current block based on the information on the received motion information, and the prediction sample deriver 332_3 may derive the predicted samples of the current block.

The decoding apparatus generates the residual samples for the current block based on the received residual information (S630). The decoding apparatus may generate the reconstruction samples for the current block based on the prediction samples and the residual samples and generate the reconstruction picture based on the generated reconstruction samples (S640). Thereafter, the in-loop filtering procedure may be further applied to the reconstruction picture as described above.

As described above, the inter prediction procedure may include an inter prediction mode determining step, a motion information deriving step depending on the determined prediction mode, and a prediction performing (predicted sample generating) step based on the derived motion information. The inter prediction procedure may be performed by the encoding apparatus and the decoding apparatus as described above.

Meanwhile, in deriving the motion information of the current block, the motion information candidate(s) may be derived based on spatial neighboring block(s) and temporal neighboring blocks(s), and the motion information candidate for the current block may be selected based on the derived motion information candidate(s). At this time, the selected motion information candidate may be used as the motion information of the current block.

Figure 8:
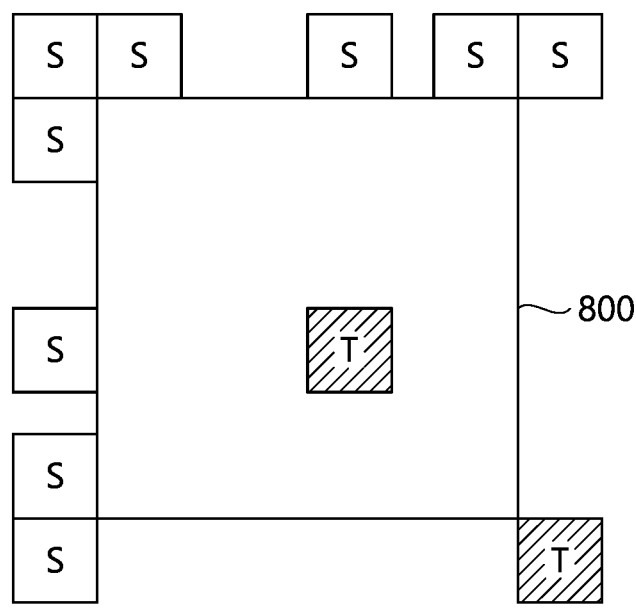
FIG. 8 exemplarily illustrates a spatial neighboring block and a temporal neighboring block of a current block.
Figure 8:
Figure 8:

FIG. 8 exemplarily illustrates the spatial neighboring blocks and the temporal neighboring blocks of the current block.

Referring to FIG. 8, the spatial neighboring block refers to neighboring blocks positioned around a current block 800, which is a target currently performing the inter prediction, and may include neighboring blocks positioned around a left of the current block 800 or neighboring blocks positioned around a top of the current block 800. For example, the spatial neighboring block may include a bottom-left neighboring block, a left neighboring block, a top-right neighboring block, a top neighboring block, and a top-left neighboring block of the current block 800. FIG. 8 illustrates the spatial neighboring blocks as "S".

According to an exemplary embodiment, the encoding apparatus/the decoding apparatus may detect available neighboring blocks by searching for the spatial neighboring blocks (e.g., the bottom-left neighboring block, the left neighboring block, the top-right neighboring block, the top neighboring block, and the top-left neighboring block) of the current block according to a predetermined order, and derive motion information of the detected neighboring blocks as a spatial motion information candidate.

The temporal neighboring block is a block positioned on a picture (i.e., reference picture) different from a current picture including the current block 800, and refers to a collocated block of the current block 800 in the reference picture. Here, the reference picture may be before or after the current picture on a picture order count (POC). Further, the reference picture used for deriving the temporal neighboring block may be referred to as a col picture (collocated picture). Further, the collocated block may refer to a block located at a position in the col picture corresponding to the position of the current block 800, and be referred to as a col block. For example, as illustrated in FIG. 8, the temporal neighboring block may include a col block (i.e., col block including a bottom-right corner sample) positioned corresponding to a position of the bottom-right corner sample of the current block 800 in the reference picture (i.e., col picture) and/or a col block (i.e., col block including a below-right center sample) positioned corresponding to a position of the below-right center sample of the current block 800 in the reference picture (i.e., col picture). FIG. 8 illustrates the temporal neighboring blocks as "T".

According to the exemplary embodiment, the encoding apparatus/the decoding apparatus may detect an available block by searching for the temporal neighboring blocks (e.g., col block including the bottom-right corner sample and the col block including the below-right center sample) of the current block according to a predetermined order, and derive motion information of the detected block as a temporal motion information candidate. As described above, a technique using the temporal neighboring block may be referred to as a temporal motion vector prediction (TMVP). Also, the temporal motion information candidate may be referred to as a TMVP candidate.

Meanwhile, the prediction may also be performed by deriving the motion information in units of subblock according to the inter prediction mode. For example, in the affine mode or the TMVP mode, the motion information may be derived in units of subblock. Particularly, a method for deriving the temporal motion information candidate in units of subblock may be referred to as a subblock-based temporal motion vector prediction (sbTMVP) candidate. Hereinafter, a method for deriving the sbTMVP candidate will be described in detail.

Figure 9:
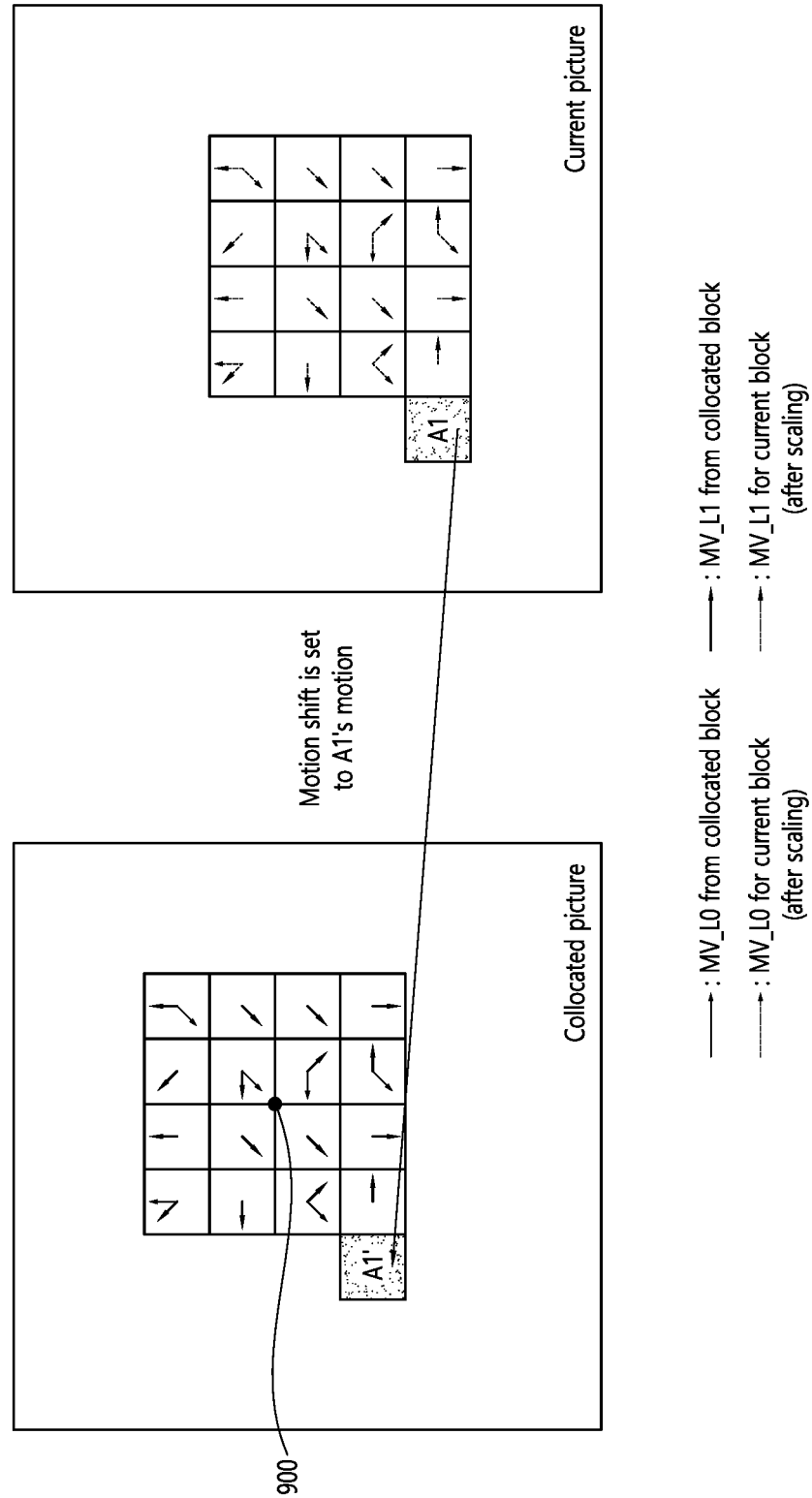
FIG. 9 is a diagram schematically explaining a process of deriving subblock-based temporal motion information candidate (sbTMVP candidate).

FIG. 9 is a diagram for schematically explaining a process of deriving the subblock-based temporal motion information candidate (sbTMVP candidate).

The sbTMVP is a method using a motion field in the col picture to improve the motion vector prediction (MVP) and the merge mode of coding units in the current picture, and the col picture of the sbTMVP may be the same as the col picture used by the TMVP. However, the TMVP performs the motion prediction at a coding unit (CU) level, but the sbTMVP may perform the motion prediction at a subblock level or a sub-coding unit (sub-CU) level. Further, the TMVP may derive the temporal motion information from the col block in the col picture (here, the col block is a col block corresponding to the position of the bottom-right corner sample of the current block or the position of the below-right center sample of the current block), and the sbTMVP may derive the temporal motion information after applying a motion shift from the col picture. Here, the motion shift may mean a process of deriving the col block (here, the col block may be referred to as col CU) for the current block using the motion vector of one (e.g., A1 neighboring block) of the spatial neighboring blocks of the current block. In this case, the spatial neighboring blocks may include at least one of a bottom-left neighboring block, a left neighboring block, a top-right neighboring block, and a top neighboring block of the current block. The block A1 shown in FIG. 9 may be a left neighboring block located on the left side of the current block among the spatial neighboring blocks.

Referring to FIG. 9, the encoding apparatus/the decoding apparatus may first determine whether the spatial neighboring block (e.g., A1) of the current block is available. For example, if the reference picture of the spatial neighboring block (e.g., A1) uses the col picture, it may be determined that the spatial neighboring block (e.g., A1) is available, and the motion vector of the spatial neighboring block (e.g., A1) may be derived. At this time, the motion vector of the spatial neighboring block (e.g., A1) may be referred to as a temporal MV (tempMV), and the motion vector may be used for the motion shift. Alternatively, if it is determined that the spatial neighboring block (e.g., A1) is not available, the temporal MV (i.e., motion vector of the spatial neighboring block) may be set as a zero vector. In other words, in this case, the motion shift may be set as (0, 0).

Next, the encoding apparatus/the decoding apparatus may apply the motion shift based on the motion vector of the spatial neighboring block (e.g., A1). For example, the motion shift may be set as the motion vector of the spatial neighboring block (e.g., A1). In other words, the motion vector of the spatial neighboring block (e.g., A1) may be added to the coordinate of the current block by applying the motion shift.

Next, the encoding apparatus/the decoding apparatus may derive a col subblock (collocated subblock) motion-shifted on the col picture and obtain the motion information (motion vector, reference index, and the like) of each col subblock. In other words, the encoding apparatus/the decoding apparatus may derive each of the col subblocks on the col picture corresponding to a position (i.e., position indicated by the motion vector of the spatial neighboring block (e.g., A1)) motion-shifted at the position of the center sample of the respective subblocks for the current block. Further, the motion information of the respective col subblocks may be used as the motion information (i.e., sbTMVP candidate) of the respective subblocks for the current block. Here, the position of the center sample may refer to a sample positioned in the bottom-right corner among 4 samples positioned at the center of the subblock.

At this time, a scaling may be applied to the motion vectors of the col subblock. The scaling may be performed based on a temporal distance difference between the reference picture of the col block and the reference picture of the current block. Therefore, the scaling may be referred to as a temporal motion scaling, such that the reference pictures of the current block and the reference pictures of the temporal motion vectors may be aligned. In this case, the encoding apparatus/the decoding apparatus may obtain the scaled motion vectors of the col subblock as the motion information of the respective subblocks for the current block.

Further, in deriving the sbTMVP candidate, motion information may not exist in the col subblock. In this case, base motion information may be derived with respect to the col subblock in which the motion information does not exist, and this base motion information may be used as the motion information of the subblock for the current block. The base motion information may be derived from a block located in the center of the col block (i.e., col CU). For example, motion information (e.g., motion vector) may be derived from the block including a sample located in the bottom-right among four samples located in the center of the col block, and the motion information may be used as the base motion information. In FIG. 9, the motion information of the bottom-right subblock among the four subblocks may be derived as the base motion information based on a point 900 indicated in the center of the col block (i.e., col CU) on the collocated picture (col picture).

As described above, the motion information of the subblock may be derived based on the center location of each subblock. For example, the motion information of the subblock may be derived from each col subblock including the center of each 8×8 subblock. In this case, the number of subblocks in X and Y directions may be as follows.

$$numSbX = cbWidth >> 3$$
$$numSbY = cbHeight >> 3$$

That is, the number of subblocks in X direction (numSbX) may be derived based on the width of the current block and the size of the subblock, and the number of subblocks in Y direction (numSbY) may be derived based on the height of the current block and the size of the subblock.

The center location of the col CU used to derive the base motion information may be different from the center location of the col subblocks. Accordingly, the base motion information may additionally require a motion vector scaling process.

Accordingly, in the present disclosure, a scheme for more effectively deriving the base motion information from the sbTMVP is proposed.

As an embodiment, one of the sbTMVP (i.e., motion information of the subblocks) of the subblocks may be used as the base motion information in the sbTMVP. In this case, an additional process for deriving the base motion information may be omitted. That is, according to an embodiment of the present disclosure, the motion vector scaling process that is necessary to derive the base motion information is removed, and thus computational complexity can be reduced. As the subblock motion information used as the base motion information, one of the followings may be used.

(1) Motion information of the col subblock located in the top-left in the col CU (2) Motion information of a subblock including a block located in numSbX>>1 and numSbY>>1. This subblock may be a block located in the center of the col CU.

(3) First available col subblock in which motion information exists. Before the first available col subblock is derived, the base motion information may be initialized to 0. Here, the first available col subblock may be the col subblock searched as the firstly available one (i.e., in which motion information exists) through searching for availability of the col subblocks in the col CU according to the determined order. The search order may be determined based on the order in which the subblocks in the col CU are indexed. For example, the index value may be configured in the order from the subblock located in the top-left to the subblock located in the bottom-right in the col CU.

(4) Last available col subblock in which motion information exists. The base motion information may be updated while deriving the motion information of the available subblock in the current CU. Here, the last available col subblock may be the col subblock searched as the lastly available one (i.e., in which motion information exists) through searching for availability of the col subblocks in the col CU according to the determined order. The search order may be determined based on the order in which the subblocks in the col CU are indexed. For example, the index value may be configured in the order from the subblock located in the top-left to the subblock located in the bottom-right in the col CU.

Since the (4) may be used in combination with the (1) or (2), the base motion information may be initialized to the (1) or (2), and thereafter, may be updated while motion information of other subblocks is derived.

As in the current VVC standards, the availability of the base motion information may be used to early terminate the motion information derivation process of the remaining subblocks. If the base motion information does not exist (e.g., it is not coded in an inter mode), the sbTMVP may be indicated as available.

The following Table 1 represents specifications for implementing the method proposed in an embodiment of the present disclosure as described above, and as an example, it may be applied to a case where the motion information of the subblock located in the center is used as the base motion information.

TABLE 1

8.5.5.3 Derivation process for subblock-based temporal merging candidates
Inputs to this process are:
- a luma location ( xCb, yCb ) of the top-left sample of the current luma coding block relative to the top-left luma sample of the current picture,
- a variable cbWidth specifying the width of the current coding block in luma samples,
- a variable cbHeight specifying the height of the current coding block in luma samples.
- the availability flag availableFlagA$_1$ of the neighbouring coding unit,
- the reference index refIdxLXA$_1$ of the neighbouring coding unit with X being 0 or 1,
- the prediction list utilization flag predFlagLXA$_1$ of the neighbouring coding unit with X being 0 or 1,
- the motion vector in $\frac{1}{16}$ fractional-sample accuracy mvLXA$_1$ of the neighbouring coding unit with X being 0 or 1.
Outputs of this process are:
- the availability flag availableFlagSbCol,
- the number of luma coding subblocks in horizontal direction numSbX and in vertical direction numSbY,
- the reference indices refIdxL0SbCol and refIdxL1SbCol,
- the luma motion vectors in $\frac{1}{16}$ fractional-sample accuracy mvL0SbCol[ xSbIdx ][ ySbIdx ] and mvL1SbCol[ xSbIdx ][ ySbIdx ] with xSbIdx = 0..numSbX − 1, ySbIdx = 0 .. numSbY − 1,
- the prediction list utilization flags predFlagL0SbCol[ xSbIdx ][ ySbIdx ] and predFlagL1SbCol[ xSbIdx ][ ySbIdx ] with xSbIdx = 0..numSbX − 1, ySbIdx = 0 .. numSbY − 1.

TABLE 1-continued

The availability flag availableFlagSbCol is derived as follows.
  If one or more of the following conditions is true, availableFlagSbCol is set equal to 0.
  - slice_temporal_mvp_enabled_flag is equal to 0.
  - sps_sbtmvp_enabled_flag is equal to 0.
  - cbWidth is less than 8.
  - cbHeight is less than 8.
- Otherwise, the following ordered steps apply:
    1. The variables numSbX, numSbY, sbWidth, sbHeight and refIdxLXSbCol are derived as follows:
       numSbX = cbWidth >> 3                                       (8 51x)
       numSbY = cbHeight >> 3                                      (8 51x)
       sbWidth = cbWidth / numSbX                                         (8 52x)
       sbHeight = cbHeight / numSbY                                       (8 52x)
       refIdxLXSbCol = 0                                                  (8 52x)
    2.    The location ( xCtb, yCtb ) of the top-left sample of the luma coding tree block that contains the
          current coding block and the location ( xColCtrCb, yColCtrCb ) of the centersub-block are derived
          as follows:
          xCtb = ( xCb >> CtuLog2Size ) << CtuLog2Size                    (8-514)
          yCtb = ( yCb >> CtuLog2Size ) << CtuLog2Size                    (8-515)
          xColCtrCb = xCb + ( sbWidth*( numSbX >>1 )( )                   (8-516)
          yColCtrCb = yCb + ( sbHeight*( numSbY >>1) )                    (8-517)
    3.    The derivation process for subblock-based temporal merging base motion data as specified in
          clause 8.5.5.4 is invoked with the location ( xCtb, yCtb ), the location ( xColCtrCb, yColCtrCb ),
          the availability flag availableFlagA$_1$, and the prediction list utilization flag predFlagLXA$_1$, and the
          reference index refIdxLXA$_1$, and the motion vector mvLXA$_1$, with X being 0 and 1 as inputs and
          the motion vectors ctrMvLX, and the prediction list utilization flags ctrPredFlagLX of the collocated
          block, with X being 0 and 1, and the temporal motion vector tempMv as outputs.
    4.    The variable availableFlagSbCol is derived as follows:
          - If both ctrPredFlagL0 and ctrPredFlagL1 are equal to 0, availableFlagSbCol is set equal to 0.
          - Otherwise, availableFlagSbCol is set equal to 1.
When availableFlagSbCol is equal to 1, the following applies:
- For xSbIdx = 0..numSbX − 1 and ySbIdx = 0 .. numSbY − 1, the motion vectors
  mvLXSbCol[ xSbIdx ][ ySbIdx ] and prediction list utilization flags
  predFlagLXSbCol[ xSbIdx ][ ySbIdx ] are derived as follows:
    -     If xSbIdx != (numSbX >>1) && ySbIdx != (numSbY >>1),
          -   The luma location ( xSb, ySb ) specifying the top-left sample of the current coding subblock
              relative to the top-left luma sample of the current picture is derived as follows:
              xSb = xCb + xSbIdx * sbWidth +
              (sbWidth>>1)                                                (8-523)
              ySb = yCb + ySbIdx * sbHeight +
              (sbHeight>>1)                                               (8-524)
              The location ( xColSb, yColSb ) of the collocated subblock inside ColPic is derived as follows.
              xColSb = Clip3( xCtb,
                 Min( CurPicWidthInSamplesY − 1, xCtb + ( 1 << CtbLog2SizeY ) + 3 ),(8-52
              5)
                 xSb + ( tempMv[0] >> 4 ) )
              yColSb = Clip3( yCtb,
                 Min( CurPicHeightInSamplesY − 1, yCtb + ( 1 << CtbLog2SizeY ) − 1), (8-5
              26)
                 ySb + ( tempMv[1] >> 4 ) )
              The variable currCb specifies the luma coding block covering the current coding subblock inside
              the current picture.
              The variable colCb specifies the luma coding block covering the modified location given by
              ( ( xColSb >> 3 ) << 3, ( yColSb >> 3 ) << 3 ) inside the ColPic.
              The luma location ( xColCb, yColCb ) is set equal to the top-left sample of the collocated luma
              coding block specified by colCb relative to the top-left luma sample of the collocated picture
              specified by ColPic.
              The derivation process for collocated motion vectors as specified in clause 8.5.2.12 is invoked
              with currCb, colCb, ( xColCb, yColCb ), refIdxL0 set equal to 0 and sbFlag set equal to 1 as
              inputs and the output being assigned to the motion vector of the subblock
              mvL0SbCol[ xSbIdx ][ ySbIdx ] and availableFlagL0SbCol.
              The derivation process for collocated motion vectors as specified in clause 8.5.2.12 is invoked
              with currCb, colCb, ( xColCb, yColCb ), refIdxL1 set equal to 0 and sbFlag set equal to 1 as
              inputs and the output being assigned to the motion vector of the subblock
              mvL1SbCol[ xSbIdx ][ ySbIdx ] and availableFlagL1SbCol.
- - If xSbIdx == (numSbX >>1) && ySbIdx == (numSbY >>1) or when availableFlagL0SbCol and
  availableFlagL1SbCol are both equal to 0, the following applies for X being 0 and 1:
              mvLXSbCol[ xSbIdx ][ ySbIdx ] = ctrMvLX                     (8-527)
              predFlagLXSbCol[ xSbIdx ] [ ySbIdx ] = ctrPredFlagLX        (8-528)

The following Table 2 shows that the same function as that in Table 1 can be performed, and more logically in terms of the processing order.

TABLE 2

8.5.5.3 Derivation process for subblock-based temporal merging candidates
...
Otherwise, the following ordered steps apply:
1. The location ( xCtb, yCtb ) of the top-left sample of the luma coding tree block that contains the current coding block and the location ( xCtr, yCtr ) of the below-right center sample of the current luma coding block are derived as follows:
xCtb = ( xCb >> CtuLog2Size ) << CtuLog2Size (8 514)
yCtb = ( yCb >> CtuLog2Size ) << CtuLog2Size (8 515)
3. The derivation process for subblock-based temporal merging mv shift as specified in clause 8.5.5.4 is invoked with the location ( xCtb, yCtb ), , the availability flag availableFlagA1, and the prediction list utilization flag predFlagLXA1, and the reference index refIdxLXA1, and the motion vector mvLXA1, with X being 0 and 1 as inputs and the temporal motion vector tempMv as outputs.
4.
Intialize availableFlagSbColt to 1,
- The variables numSbX, numSbY, sbWidth, sbHeight and refIdxLXSbCol are derived as follows:
numSbX = cbWidth >> 3 (8 518)
numSbY = cbHeight >> 3 (8 519)
sbWidth = cbWidth / numSbX (8 520)
sbHeight = cbHeight / numSbY (8 521)
refIdxLXSbCol = 0 (8 522)
-For xSbLoopIdx = 0..numSbX − 1 and ySbLoopIdx = 0 .. numSbY − 1, and if availableFlagSbColt equals to 1, the motion vectors mvLXSbCol[ xSbIdx ][ ySbIdx ] and prediction list utilization flags predFlagLXSbCol[ xSbIdx ][ ySbIdx ] are derived as follows:
- Set the sub block index. Motion data of the first sub-block in processing order is used as base motion vector.
    xSbIdx =( xSbLoopIdx+( numSbX>>1))% numSbX
    ySbIdx==( ySbLoopIdx+( numSbY>>1))% numSbY
- The luma location ( xSb, ySb ) specifying the top-left sample of the current coding subblock relative to the top left luma sample of the current picture is derived as follows:
xSb = xCb + xSbIdx * sbWidth + (sbWidth>>1) (8 523)
ySb = yCb + ySbIdx * sbHeight + (sbHeight>>1) (8 524)
- The location ( xColSb, yColSb ) of the collocated subblock inside ColPic is derived as follows.
xColSb = Clip3( xCtb,
    Min( CurPicWidthInSamplesY − 1, xCtb + ( 1 << CtbLog2SizeY ) + 3 ), (8 525)
    xSb + ( tempMv[0] >> 4 ) )
yColSb = Clip3( yCtb,
    Min( CurPicHeightInSamplesY − 1, yCtb + ( 1 << CtbLog2SizeY ) − 1 ), (8 526)
    ySb + ( tempMv[1] >> 4 ) )
- The variable currCb specifies the luma coding block covering the current coding subblock inside the current picture.
- The variable colCb specifies the luma coding block covering the modified location given by ( ( xColSb >> 3 ) << 3, ( yColSb >> 3 ) << 3 ) inside the ColPic.
- The luma location ( xColCb, yColCb ) is set equal to the top-left sample of the collocated luma coding block specified by colCb relative to the top-left luma sample of the collocated picture specified by ColPic.
- The derivation process for collocated motion vectors as specified in clause 8.5.2.12 is invoked with currCb, colCb, ( xColCb, yColCb ), refIdxL0 set equal to 0 and sbFlag set equal to 1 as inputs and the output being assigned to the motion vector of the subblock mvL0SbCol[ xSbIdx ][ ySbIdx] and availableFlagL0SbCol.
- The derivation process for collocated motion vectors as specified in clause 8.5.2.12 is invoked with currCb, colCb, ( xColCb, yColCb ), refIdxL1 set equal to 0 and sbFlag set equal to 1 as inputs and the output being assigned to the motion vector of the subblock mvL1SbCol[ xSbIdx ][ ySbIdx ] and availableFlagL1SbCol.
- If (xSbLoopIdx == 0) and (ySbLoopIdx == 0 )
  The variable availableFlagSbCol is derived as follows:
    - If both availableFlagL0SbCol and availableFlagL1SbCol are equal to 0, availableFlagSbCol i s set equal to 0.
    - Otherwise
  ctrMvLX = mvLXSbCol[ xSbIdx ][ ySbIdx ] (8-52x)
  ctrPredFlagLX = predFlagLXSbCol[ xSbIdx ][ ySbIdx ] (8-52x)
- Otherwise when availableFlagL0SbCol and availableFlagL1SbCol are both equal to 0, the following applies for X being 0 and 1:
mvLXSbCol[ xSbIdx ][ ySbIdx ] = ctrMvLX (8 527)
predFlagLXSbCol[ xSbIdx ][ ySbIdx ] = ctrPredFlagLX (8 528)
8.5.5.4 Derivation process for subblock-based temporal merging base motion data
Inputs to this process are:
- the location (xCtb, yCtb ) of the top-left sample of the luma coding tree block that contains the current coding block,
-
- the availability flag availableFlagA1 of the neighbouring coding unit,
- the reference index refIdxLXA1 of the neighbouring coding unit,
- the prediction list utilization flag predFlagLXA1 of the neighbouring coding unit,
- the motion vector in $\frac{1}{16}$ fractional-sample accuracy mvLXA1 of the neighbouring coding unit.

TABLE 2-continued

Outputs of this process are:
- the temporal motion vector tempMv.
The variable tempMv is set as follows:
tempMv[ 0 ] = 0   (8 529)
tempMv[ 1 ] = 0   (8 530)
The variable currPic specifies the current picture.
When availableFlagA1 is equal to TRUE, the following applies:
- If all of the following conditions are true, tempMv is set equal to mvL1A1:
- predFlagL1A1 is equal to 1,
- DiffPicOrderCnt(ColPic, RefPicList[ 1 ][refIdxL1A1]) is equal to 0,
- DiffPicOrderCnt(aPic, currPic) is less than or equal to 0 for every picture aPic in every reference picture list of the current slice,
- slice_type is equal to B,
- collocated_from_l0_flag is equal to 0.
- Otherwise if all of the following conditions are true, tempMv is set equal to mvL0A1:
- predFlagL0A1 is equal to 1,
- DiffPicOrderCnt(ColPic, RefPicList[ 0 ][refIdxL0A1]) is equal to 0.

Further, as an embodiment of more effectively deriving the base motion information from the sbTMVP, the TMVP motion information may be used as the base motion information of the sbTMVP instead of separately performing the process of deriving the base motion information. This method can reduce the complexity of the sbTMVP deriving process, and particularly, in the worst case, the number of times of motion vector scaling can be reduced, and this may occur in case of using the TMVP and the sbTMVP in all with respect to the CU. In case of applying the proposed method, if the TMVP is already available, the TMVP can be reused as the base motion information of the sbTMVP, and thus the motion vector scaling process that is necessary to derive the base motion information can be reduced. Further, by integratedly performing the TMVP derivation process and the sbTMVP derivation process, efficiency can be improved.

For example, in deriving the motion information of the TMVP, as described above, the available block may be detected by searching the temporal neighboring block (e.g., col block including the bottom-right corner sample and col block including the center bottom-right sample) of the current block in the determined order, and the motion information of the detected block may be derived as the temporal motion information (i.e., TMVP). The TMVP derived as above may be used as the base motion information of the sbTMVP.

The following Table 3 represents specifications for implementing the method proposed in an embodiment of the present disclosure as described above, and represents an example in which the TMVP is used as the base motion information of the sbTMVP.

TABLE 3

8.5.5.4 Derivation process for subblock-based temporal merging base motion data
Inputs to this process are:
- the location ( xCtb, yCtb ) of the top-left sample of the luma coding tree block that contains the current coding block,
- the location ( xColCtrCb, yColCtrCb ) of the top-left sample of the collocated luma coding block that covers the below-right center sample.
- a variable cbWidth specifying the width of the current coding block in luma samples,
- a variable cbHeight specifying the height of the current coding block in luma samples,
- the availability flag availableFlagA1 of the neighbouring coding unit.
- the reference index refIdxLXA1 of the neighbouring coding unit,
- the prediction list utilization flag predFlagLXA1 of the neighbouring coding unit,
- the motion vector in 1/16 fractional-sample accuracy mvLXA1 of the neighbouring coding unit.
Outputs of this process are:
- the motion vectors ctrMvL0 and ctrMvL1,
- the prediction list utilization flags ctrPredFlagL0 and ctrPredFlagL1,
- the temporal motion vector tempMv.
The variable tempMv is set as follows:
tempMv[ 0 ] = 0                                                           (8 529)
tempMv[ 1 ] = 0                                                           (8 530)
The variable currPic specifies the current picture.
When availableFlagA1 is equal to TRUE, the following applies:
- If all of the following conditions are true, tempMv is set equal to mvL1A1:
- predFlagL1A1 is equal to 1,
- DiffPicOrderCnt(ColPic, RefPicList[ 1 ][refIdxL1A1]) is equal to 0,
- DiffPicOrderCnt(aPic, currPic) is less than or equal to 0 for every picture aPic in every reference picture list of the current slice,
- slice_type is equal to B,
- collocated_from_l0_flag is equal to 0.
- Otherwise if all of the following conditions are true, tempMv is set equal to mvL0Al:
- predFlagL0A1 is equal to 1,
- DiffPicOrderCnt(ColPic, RefPicList[ 0 ][refIdxL0A1]) is equal to 0.The location ( xColCb, yColCb ) of the collocated block inside ColPic is derived as follows.
  xColCb = Clip3( xCtb,
          Min( CurPicWidthInSamplesY − 1, xCtb + ( 1 << CtbLog2SizeY ) + 3 ), (8-531)
          xColCtrCb + ( tempMv[0] >> 4 ) )

TABLE 3-continued

```
                yColCb = Clip3( yCtb,
                                Min( CurPicHeightInSamplesY − 1, yCtb + ( 1 << CtbLog2SizeY ) − 1 ),(8-532)
                                yColCtrCb + ( tempMv[1] >> 4 ) )
```
The array colPredMode is set equal to the prediction mode array CuPredMode of the collocated picture specified by ColPic.
The motion vectors ctrMvL0 and ctrMvL1, and the prediction list utilization flags ctrPredFlagL0 and ctrPredFlagL1 are derived as follows:
-
                If colPredMode[xColCb][yColCb] is equal to MODE_INTER, the following applies:
-
        -        The derivation process for temporal luma motion vector prediction as specified in clause 8.5.2.11 is
                with the luma coding block location ( xCb, yCb ), the luma coding block width cbWidth, the luma
                coding block height cbHeight and refIdxLX as inputs, and with the output being the availability flag
                ctrPredFlagLX and the temporal motion vector predictor ctrMvLX.
-        Otherwise, the following applies:
```
                        ctrPredFlagL0 = 0                                                                (8-533)
                        ctrPredFlagL1 = 0                                                                (8-534)
```

Referring to the above Table 3, the location (xColCb, yColCb) may be a motion-shifted (mv shifted) col block, and the location (xColCtrCb, yColCtrCb) may represent a col block that is not motion-shifted. In the current VVC standards, the derivation of the base motion information may differ depending on whether "the prediction mode (colPredMode[xColCb][yColCb]) of the col block is an inter prediction mode (MODE_INTER)".

In case of using the TMVP as the base motion information of the sbTMVP as in an embodiment of the present disclosure, the process of identifying whether "the prediction mode (colPredMode[xColCtrCb][yColCtrCb]) of the col block is the inter prediction mode (MODE_INTER)" may be further simplified. Then, it is not necessary to derive the location (xColCb, yColCb).

Meanwhile, as described above, in the HEVC and the current VVC, the TMVP may be derived using the col block (col CU) that is in the same location as the current block (i.e., current CU) on the col picture. That is, the TMVP is derived from the col block in the location that is not motion-shifted. However, in case of the TMVP being derived as above, only the temporal similarity is considered, and thus intra motion may not be effectively reflected.

Accordingly, the present disclosure proposes a scheme for applying a motion shift to the TMVP. As an embodiment, the motion shift in the TMVP may be performed in a similar manner to the sbTMVP method for deriving the col block by performing the motion shift based on the motion information of the neighboring blocks. That is, the col block on the col picture may be derived by performing the motion shift based on the location indicated by the motion vector of the spatial neighboring block, and the motion vector of the derived col block may be used as the temporal motion information (TMVP). According to the TMVP derived by applying the motion shift as above, since the col block is derived using the spatial neighboring block, the accuracy of the col block can be enhanced as compared with the existing TMVP method. Further, by applying the motion shift to the TMVP, the coding efficiency can be improved, and the efficiency can be increased through integration of the TMVP and sbTMVP processes. Further, the TMVP derived by applying the motion shift as above may be used as the base motion information in the sbTMVP.

Figure 10:
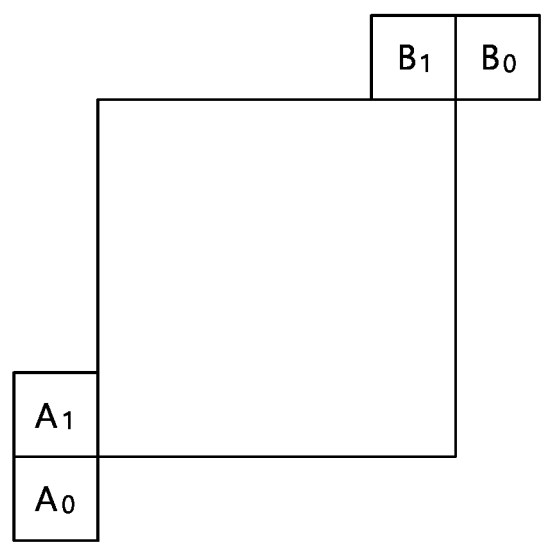
FIG. 10 exemplarily illustrates spatial neighboring blocks that can be used to derive temporal motion information (TMVP).

FIG. 10 exemplarily illustrates spatial neighboring blocks that can be used to derive temporal motion information (TMVP).

Referring to FIG. 10, the spatial neighboring block that can be used in the TMVP mode may include at least one of a bottom-left corner neighboring block A0, a left neighboring block A1, a top-right corner neighboring block B0, and a top neighboring block B1 of the current block. According to circumstances, the spatial neighboring block may further include other neighboring blocks (e.g., top-left corner neighboring block) in addition to the neighboring blocks illustrated in FIG. 10, or may not include a specific neighboring block among the neighboring blocks illustrated in FIG. 10. Further, the spatial neighboring block may include only the specific neighboring block, and for example, only a left neighboring block A1 of the current block.

In case that the TMVP mode is applied, in configuring temporal motion information candidates, the encoding apparatus/decoding apparatus may detect a motion vector (temporal vector) of the firstly available spatial neighboring block while searching the spatial neighboring blocks in a predetermined search order, and may determine the block in the location indicated by the motion vector (temporal vector) of the spatial neighboring block in the reference picture as the col block.

In this case, the availability of the spatial neighboring block may be determined by reference picture information, prediction mode information, and location information of the spatial neighboring block. For example, if the reference picture of the spatial neighboring block is the same as the reference picture of the current block, it may be determined that the corresponding spatial neighboring block is available. Further, if the spatial neighboring block is coded in the intra prediction mode, or the spatial neighboring block is located outside the current picture/tile, it may be determined that the corresponding spatial neighboring block is not available.

Further, the search order of the spatial neighboring block may be variously defined, and for example, may be the order of A1, B1, B0, and A0. Further, by searching only A2, whether the A1 is available may be determined.

As an embodiment, in applying the motion shift to the TMVP, the motion shift may be performed based on the motion vector obtained from one spatial neighboring block (e.g., A1 block). For example, it may be first checked whether the motion vector of the spatial neighboring block (e.g., A1 block) uses the col picture as the reference picture. In this case, if the motion vector of the spatial neighboring block (e.g., A1 block) uses the col picture as the reference picture, the motion vector of the spatial neighboring block (e.g., A1 block) may be selected as the motion vector used for the motion shift. Otherwise, the motion shift may be set to (0, 0).

As another embodiment, in applying the motion shift to the TMVP, the motion shift may be performed based on a plurality of spatial neighboring blocks (e.g., A1, B1, B0, and A0 blocks). For example, a spatial neighboring block in which the motion vector that uses the col picture as the reference picture exists may be first selected, and the motion vector of the selected spatial neighboring block may be used for the motion shift. In this case, the motion vector of the firstly available spatial neighboring block may be selected and used for the motion shift while the plurality of spatial neighboring blocks (e.g., A1, B1, B0, and A0 blocks) are searched according to the predetermined search order (e.g., in the order of A1, B1, B0, and A0).

As in the above-described embodiments, after the motion vector to be used for the motion shift is obtained from the spatial neighboring block(s), the motion shift may be applied based on the motion vector. That is, the motion shift may be performed by adding the motion vector of the spatial neighboring block to the location on the coordinates of the current block. As described above, the CU level motion information (e.g., motion vector and reference index) may be obtained from the col picture based on the location in which the motion shift is applied. Next, the bottom-right location C1 (e.g., sample located on the bottom-right side) of the motion-shifted col block may be checked. In this case, if the sample C1 located on the bottom-right side is available, the motion information of the col block including the sample C1 located on the bottom-right side may be derived as the motion information of the TMVP. Further, if the sample C1 located on the bottom-right side is not available, the center location C0 (i.e., sample located in the center) of the motion-shifted col block may be checked. In this case, if the sample C0 located in the center is available, the motion information of the col block including the sample C0 located in the center may be derived as the motion information of the TMVP.

In order to reduce the hardware memory bandwidth, the sample C1 located on the bottom-right side and the sample C0 located in the center may be restricted. For example, the same constraint as that in the sbTMVP may be used. That is, the y axis of C1 and C0 may be in the same CTU row as that of the current CTU, and the x axis of C1 and C0 may be restricted to be within a fixed distance from the current CTU.

The following drawings have been prepared to explain detailed examples of the present disclosure. The names of detailed devices described in the drawings or detailed terms or names (e.g., names of syntax/syntax elements) are exemplarily presented, and thus the technical features of the present disclosure are not limited to the detailed names used in the following drawings.

Figure 11:
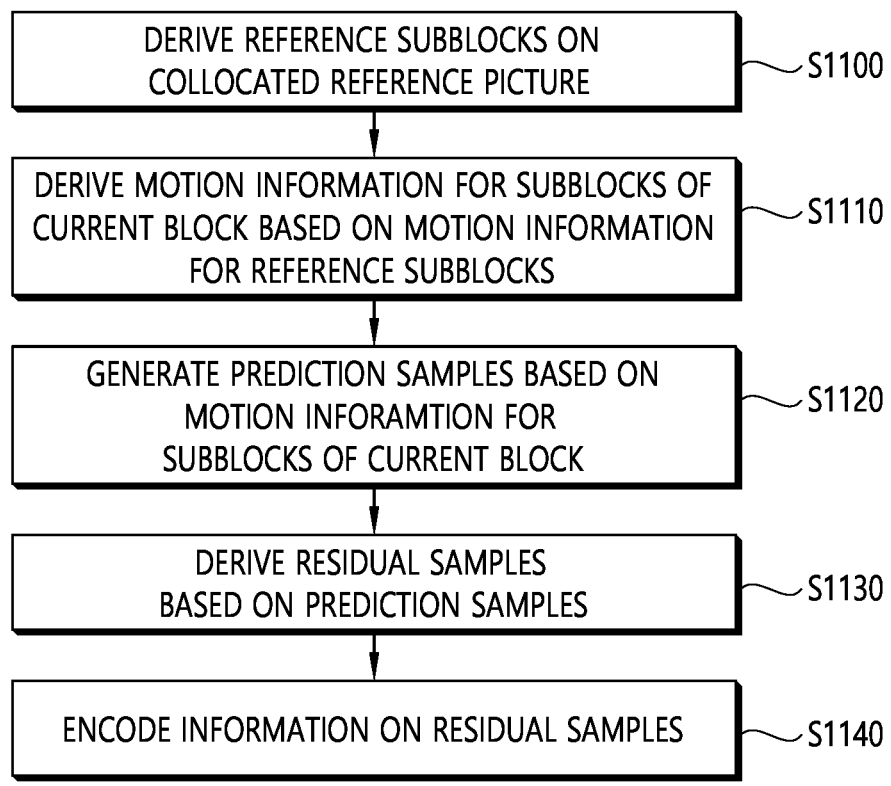
FIGS. 11 and 12 schematically illustrate an example of a video/image encoding method and related components according to embodiment(s) of the present disclosure.
Figure 12:
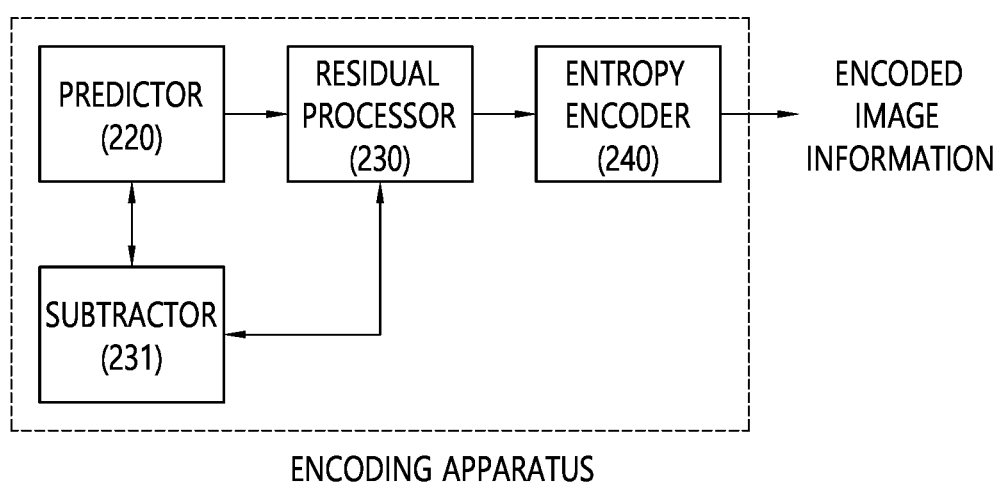

FIGS. 11 and 12 schematically illustrate an example of a video/image encoding method and related components according to embodiment(s) of the present disclosure.

The method disclosed in FIG. 11 may be performed by the encoding apparatus 200 disclosed in FIG. 2. Specifically, steps S1100 to S1120 of FIG. 11 may be performed by the predictor 220 (more specifically, inter predictor 221) disclosed in FIG. 2, a step S1130 of FIG. 11 may be performed by the residual processor 230 disclosed in FIG. 2, and a step S1140 of FIG. 11 may be performed by the entropy encoder 240 disclosed in FIG. 2. Further, the method disclosed in FIG. 11 may include the above-described embodiments of the present disclosure to be performed. Accordingly, in FIG. 11, the detailed explanation of the embodiments duplicate to the above-described embodiments will be omitted or simplified.

Referring to FIG. 11, the encoding apparatus may derive reference subblocks on a collocated reference picture for subblocks of the current block (S1100).

Here, the collocated reference picture may be a reference picture used to derive temporal motion information (i.e., sbTMVP) as described above, and may be referred to as the col picture. The reference subblocks may be referred to as the above-described col subblocks.

As an embodiment, the encoding apparatus may derive a motion vector from the spatial neighboring block of the current block.

For example, the spatial neighboring block of the current block may be a left neighboring block (may be A1 of FIG. 9 or FIG. 10) located on the left side of the current block, and the motion vector of the spatial neighboring block may be a motion vector derived from the left neighboring block in case that the left neighboring block is available. Further, in case that the left neighboring block is not available, a zero vector may be used. Here, whether the spatial neighboring block is available may be determined by reference picture information, prediction mode information, and location information of the spatial neighboring block. For example, in case that the reference picture of the spatial neighboring block and the reference picture of the current block are the same, it may be determined that the corresponding spatial neighboring block is available. Further, in case that the spatial neighboring block is coded in the intra prediction mode, or the spatial neighboring block is located outside the current picture/tile, it may be determined that the corresponding spatial neighboring block is not available.

Further, the encoding apparatus may derive the reference subblocks on the collocated reference picture corresponding to the motion-shifted location based on the motion vector derived from the spatial neighboring block.

For example, the encoding apparatus may specify the center sample location in each of the subblocks of the current block, apply the motion shift to the location indicated by the motion vector of the spatial neighboring block (e.g., left neighboring block) in the center sample location in each of the subblocks, and derive each of the reference subblocks within the collocated reference picture based on the motion-shifted location. Here, the center sample location may be referred to as a sample located in the bottom-right among four samples located in the center of the subblock.

The encoding apparatus may derive the motion information (i.e., sbTMVP) for the subblocks of the current block based on the motion information for the reference subblocks (S1110).

That is, the encoding apparatus may derive the motion information of the reference subblocks on the collocated reference picture derived as described above as the motion information for the subblocks of the current block. For example, the motion vector and reference index of the reference subblocks may be set as the motion vector and the reference index for the subblock of the current block.

The encoding apparatus may derive the base motion information with respect to the reference subblock in which the motion information (e.g., motion vector) is not available among the reference subblocks. In other words, the encoding apparatus may derive the base motion information with respect to the reference subblock in which the motion information does not exist among the reference subblocks. In this case, the base motion information may be used as the motion information for the subblock of the current block corresponding to the unavailable reference subblock.

In deriving the base motion information, the above-described embodiments may be applied, and for example, the base motion information may be derived based on the motion information of the reference subblocks, or the base motion information may be derived based on the motion information (i.e., TMVP) derived from the temporal neighboring block.

As an embodiment, the encoding apparatus may derive the base motion information based on one of the reference subblocks of the reference block located corresponding to the current block in the collocated reference picture.

For example, the encoding apparatus may use the motion information of the reference subblock located in the top-left among the reference subblocks included in the reference block as the base motion information.

Further, for example, the encoding apparatus may use the motion information of the reference subblock located in the center among the reference subblocks included in the reference block as the base motion information. Here, the reference subblock located in the center may be the subblock including the bottom-right sample among four samples located in the center.

Further, for example, the encoding apparatus may derive the base motion information based on the reference subblock in which the motion vector is available among the reference subblocks included in the reference block. As an example, the encoding apparatus may check whether the motion vector is available according to the determined order with respect to the reference subblocks included in the reference block, derive the motion vector from the reference subblock having the motion vector that is checked to be firstly available or from the reference subblock having the motion vector that is checked to be lastly available, and use the derived motion vector as the base motion information.

As another embodiment, the encoding apparatus may derive the base motion information using the motion information (i.e., TMVP) derived based on the temporal neighboring block of the current block. As described above, the temporal neighboring block may include the reference block on the collocated reference picture corresponding to the bottom-right corner sample location of the current block or the reference block on the collocated reference picture corresponding to the center sample location of the current block.

For example, the encoding apparatus may detect an available block by searching the temporal neighboring block (e.g., reference block including the bottom-right corner sample or reference block including the bottom-right center sample) of the current block in the determined order, and may derive the motion information of the detected block as the temporal motion information (i.e., TMVP). Further, the encoding apparatus may use the temporal motion information (i.e., TMVP) as the base motion information.

In this case, according to an embodiment, the temporal neighboring block may be derived by applying the motion shift. For example, the encoding apparatus may derive the temporal neighboring block by performing the motion shift based on the motion vector derived from the spatial neighboring block of the current block. Further, the encoding apparatus may use the motion information of the motion-shifted temporal neighboring block as the base motion information.

In applying the motion shift to the temporal neighboring block, as an example, the encoding apparatus may perform the motion shift based on the motion vector obtained from one spatial neighboring block (e.g., A1 block illustrated in FIG. 9 or FIG. 10). In this case, if the motion vector of the spatial neighboring block (e.g., A1 block) is available, the encoding apparatus may apply the motion shift to the temporal neighboring block using this motion vector. As another embodiment, the encoding apparatus may perform the motion shift by obtaining the motion vector based on a plurality of spatial neighboring blocks (e.g., A1, B1, B0, and A0 blocks). In this case, the encoding apparatus may select the motion vector of the firstly available spatial neighboring block while searching the plurality of spatial neighboring blocks (e.g., A1, B1, B0, and A0 blocks) according to the predetermined search order (e.g., in the order of A1, B1, B0, and A0) and use the selected motion vector for the motion shift.

After the motion-shifted temporal neighboring block is derived as described above, the encoding apparatus may check whether the motion vector of the block including the sample located on the bottom-right side of the temporal neighboring block on the collocated reference picture is available, and in case of the available motion vector, the encoding apparatus may derive the motion information of the block including the sample located on the bottom-right side of the temporal neighboring block, and may use the derived motion information as the base motion information. Further, in case that the motion vector of the block including the sample located on the bottom-right side of the temporal neighboring block is not available, the encoding apparatus may check whether the motion vector of the block including the sample located in the center of the temporal neighboring block on the collocated reference picture is available, and in case of the available motion vector, the encoding apparatus may derive the motion information of the block including the sample located in the center of the temporal neighboring block, and may use the derived motion information as the base motion information.

The encoding apparatus may generate prediction samples based on the motion information for the subblocks of the current block (S1120).

The encoding apparatus may select the optimum motion information based on a rate-distortion (RD) cost, and based on this, may generate the prediction samples. For example, if the motion information (i.e., sbTMVP) derived in the unit of a subblock with respect to the current block is selected as the optimum motion information, the encoding apparatus may generate the prediction samples of the current block based on the derived motion information for the subblocks of the current block.

The encoding apparatus may derive residual samples based on the prediction samples (S1130), and may encode image information including information on the residual samples (S1140).

That is, the encoding apparatus may derive the residual samples based on the original samples of the current block and the prediction samples of the current block. Further, the encoding apparatus may generate the information on the residual samples. Here, the information on the residual samples may include information, such as value information, location information, transform technique, transform kernel, and quantization parameters of quantized transform coefficients derived by performing transform and quantization with respect to the residual samples.

The encoding apparatus may encode the information on the residual samples to output the encoded information in the form of a bitstream, and may transmit the bitstream to the decoding apparatus through a network or a storage medium.

Figure 13:
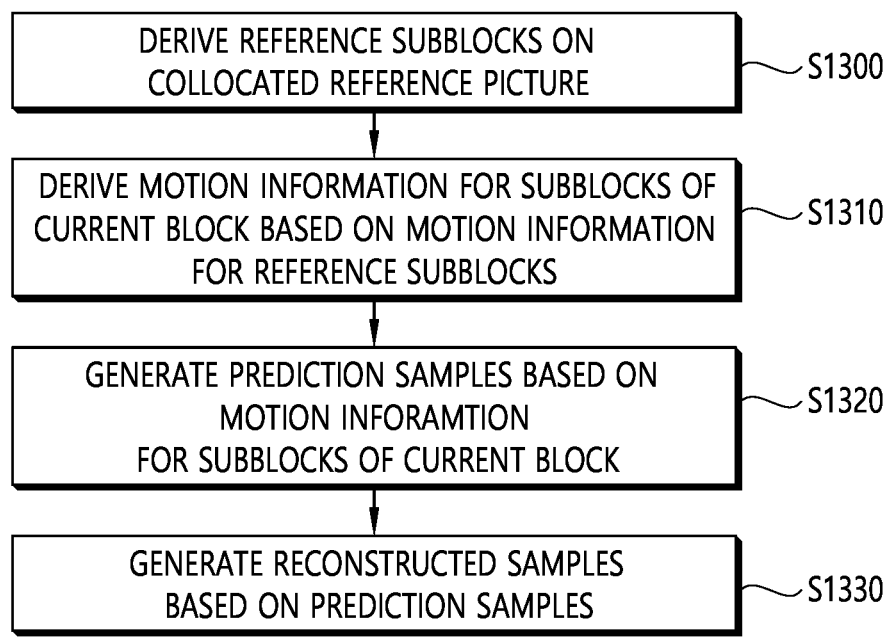
FIGS. 13 and 14 schematically illustrate an example of a video/image decoding method and related components according to embodiment(s) of the present disclosure.
Figure 14:
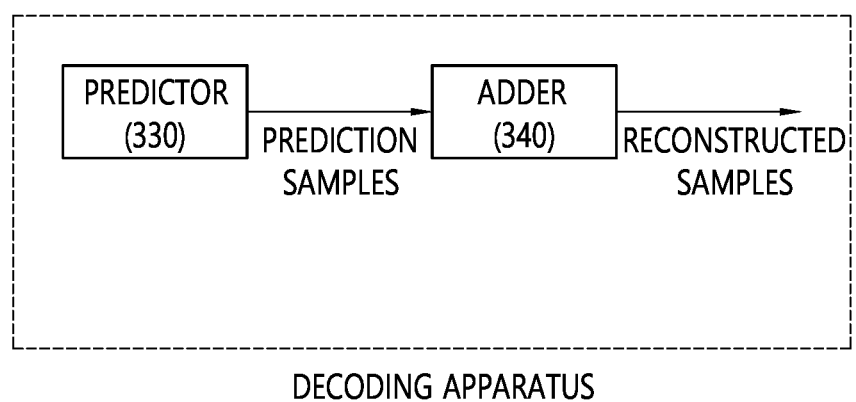

FIGS. 13 and 14 schematically illustrate an example of a video/image decoding method and related components according to embodiment(s) of the present disclosure.

The method disclosed in FIG. 13 may be performed by the decoding apparatus 300 disclosed in FIG. 3. Specifically, steps S1300 to S1320 of FIG. 13 may be performed by the predictor 330 (more specifically, inter predictor 332) disclosed in FIG. 3, a step S1330 of FIG. 13 may be performed by the adder 340 disclosed in FIG. 3. Further, the method disclosed in FIG. 13 may include the above-described embodiments of the present disclosure to be performed. Accordingly, in FIG. 13, the detailed explanation of the embodiments duplicate to the above-described embodiments will be omitted or simplified.

Referring to FIG. 13, the decoding apparatus may derive reference subblocks on a collocated reference picture for subblocks of the current block (S1300).

Here, the collocated reference picture may be a reference picture used to derive temporal motion information (i.e., sbTMVP) as described above, and may be referred to as the col picture. The reference subblocks may be referred to as the above-described col subblocks.

As an embodiment, the decoding apparatus may derive a motion vector from the spatial neighboring block of the current block.

For example, the spatial neighboring block of the current block may be a left neighboring block (may be A1 of FIG. 9 or FIG. 10) located on the left side of the current block, and the motion vector of the spatial neighboring block may be a motion vector derived from the left neighboring block in case that the left neighboring block is available. Further, in case that the left neighboring block is not available, a zero vector may be used. Here, whether the spatial neighboring block is available may be determined by reference picture information, prediction mode information, and location information of the spatial neighboring block. For example, in case that the reference picture of the spatial neighboring block and the reference picture of the current block are the same, it may be determined that the corresponding spatial neighboring block is available. Further, in case that the spatial neighboring block is coded in the intra prediction mode, or the spatial neighboring block is located outside the current picture/tile, it may be determined that the corresponding spatial neighboring block is not available.

Further, the decoding apparatus may derive the reference subblocks on the collocated reference picture corresponding to the motion-shifted location based on the motion vector derived from the spatial neighboring block.

For example, the decoding apparatus may specify the center sample location in each of the subblocks of the current block, apply the motion shift to the location indicated by the motion vector of the spatial neighboring block (e.g., left neighboring block) in the center sample location in each of the subblocks, and derive each of the reference subblocks within the collocated reference picture based on the motion-shifted location. Here, the center sample location may be referred to as a sample located in the bottom-right among four samples located in the center of the subblock.

The decoding apparatus may derive the motion information (i.e., sbTMVP) for the subblocks of the current block based on the motion information for the reference subblocks (S1310).

That is, the decoding apparatus may derive the motion information of the reference subblocks on the collocated reference picture derived as described above as the motion information for the subblocks of the current block. For example, the motion vector and reference index of the reference subblocks may be set as the motion vector and the reference index for the subblock of the current block.

The decoding apparatus may derive the base motion information with respect to the reference subblock in which the motion information (e.g., motion vector) is not available among the reference subblocks. In other words, the decoding apparatus may derive the base motion information with respect to the reference subblock in which the motion information does not exist among the reference subblocks. In this case, the base motion information may be used as the motion information for the subblock of the current block corresponding to the unavailable reference subblock.

In deriving the base motion information, the above-described embodiments may be applied, and for example, the base motion information may be derived based on the motion information of the reference subblocks, or the base motion information may be derived based on the motion information (i.e., TMVP) derived from the temporal neighboring block.

As an embodiment, the decoding apparatus may derive the base motion information based on one of the reference subblocks of the reference block located corresponding to the current block in the collocated reference picture.

For example, the decoding apparatus may use the motion information of the reference subblock located in the top-left among the reference subblocks included in the reference block as the base motion information.

Further, for example, the decoding apparatus may use the motion information of the reference subblock located in the center among the reference subblocks included in the reference block as the base motion information. Here, the reference subblock located in the center may be the subblock including the bottom-right sample among four samples located in the center.

Further, for example, the decoding apparatus may derive the base motion information based on the reference subblock in which the motion vector is available among the reference subblocks included in the reference block. As an example, the decoding apparatus may check whether the motion vector is available according to the determined order with respect to the reference subblocks included in the reference block, derive the motion vector from the reference subblock having the motion vector that is checked to be firstly available or from the reference subblock having the motion vector that is checked to be lastly available, and use the derived motion vector as the base motion information.

As another embodiment, the decoding apparatus may derive the base motion information using the motion information (i.e., TMVP) derived based on the temporal neighboring block of the current block. As described above, the temporal neighboring block may include the reference block on the collocated reference picture corresponding to the bottom-right corner sample location of the current block or the reference block on the collocated reference picture corresponding to the center sample location of the current block.

For example, the decoding apparatus may detect an available block by searching the temporal neighboring block (e.g., reference block including the bottom-right corner sample or reference block including the bottom-right center sample) of the current block in the determined order, and may derive the motion information of the detected block as the temporal motion information (i.e., TMVP). Further, the decoding apparatus may use the temporal motion information (i.e., TMVP) as the base motion information.

In this case, according to an embodiment, the temporal neighboring block may be derived by applying the motion shift. For example, the decoding apparatus may derive the temporal neighboring block by performing the motion shift based on the motion vector derived from the spatial neighboring block of the current block. Further, the decoding apparatus may use the motion information of the motion-shifted temporal neighboring block as the base motion information.

In applying the motion shift to the temporal neighboring block, as an example, the decoding apparatus may perform the motion shift based on the motion vector obtained from one spatial neighboring block (e.g., A1 block illustrated in FIG. 9 or FIG. 10). In this case, if the motion vector of the spatial neighboring block (e.g., A1 block) is available, the decoding apparatus may apply the motion shift to the temporal neighboring block using this motion vector. As another embodiment, the decoding apparatus may perform the motion shift by obtaining the motion vector based on a plurality of spatial neighboring blocks (e.g., A1, B1, B0, and A0 blocks). In this case, the decoding apparatus may select the motion vector of the firstly available spatial neighboring block while searching the plurality of spatial neighboring blocks (e.g., A1, B1, B0, and A0 blocks) according to the predetermined search order (e.g., in the order of A1, B1, B0, and A0) and use the selected motion vector for the motion shift.

After the motion-shifted temporal neighboring block is derived as described above, the decoding apparatus may check whether the motion vector of the block including the sample located on the bottom-right side of the temporal neighboring block on the collocated reference picture is available, and in case of the available motion vector, the decoding apparatus may derive the motion information of the block including the sample located on the bottom-right side of the temporal neighboring block, and may use the derived motion information as the base motion information. Further, in case that the motion vector of the block including the sample located on the bottom-right side of the temporal neighboring block is not available, the decoding apparatus may check whether the motion vector of the block including the sample located in the center of the temporal neighboring block on the collocated reference picture is available, and in case of the available motion vector, the decoding apparatus may derive the motion information of the block including the sample located in the center of the temporal neighboring block, and may use the derived motion information as the base motion information.

The decoding apparatus may generate the prediction samples based on the motion information for the subblocks of the current block (S1320).

As an embodiment, in case of a prediction mode in which prediction is performed based on motion information (i.e., sbTMVP) in the unit of a subblock for the current block, the decoding apparatus may generate the prediction samples of the current block based on the derived motion information for the subblocks of the current block.

The decoding apparatus may generate reconstructed samples based on the prediction samples (S1330).

As an example, the decoding apparatus may immediately use the prediction samples as the reconstructed samples in accordance with the prediction mode, or may generate the reconstructed samples by adding the residual samples to the prediction samples.

In case that the residual samples for the current block exist, the decoding apparatus may receive information on the residual for the current block. The information on the residual may include transform coefficients for the residual samples. The decoding apparatus may derive the residual samples (or residual sample array) for the current block based on the residual information. The decoding apparatus may generate the reconstructed samples based on the prediction samples and the residual samples, and may derive a reconstructed block or a reconstructed picture based on the reconstructed samples. Thereafter, as described above, the decoding apparatus, if necessary, may apply an in-loop filtering procedure, such as a deblocking filtering and/or SAO procedure, to the reconstructed picture in order to improve the subjective/objective picture quality.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which the present disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blu-ray player, Internet access TV, a home theater system, a smartphone, a tablet PC, and a digital video recorder (DVR).

Furthermore, the processing method to which the present disclosure is applied may be produced in the form of a program executed by a computer, and may be stored in a computer-readable recording medium. Multimedia data having a data structure according to the present disclosure may also be stored in a computer-readable recording medium. The computer-readable recording medium includes all types of storage devices in which computer-readable data is stored. The computer-readable recording medium may include Blu-ray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the present disclosure may be implemented as a computer program product using program code. The program code may be performed by a computer according to an embodiment of the present disclosure. The program code may be stored on a carrier readable by a computer.

Figure 15:
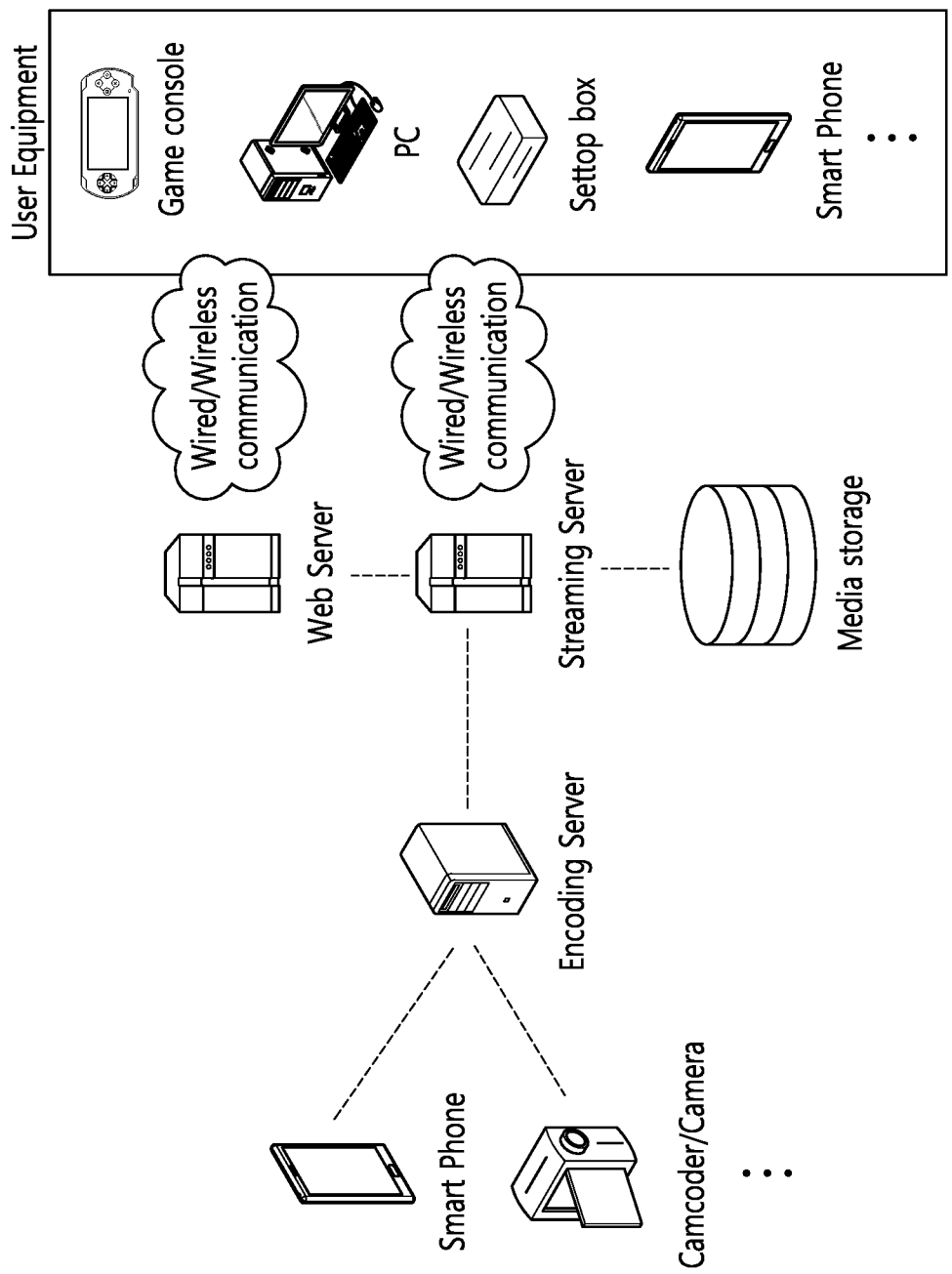
FIG. 15 illustrates an example of a content streaming system to which embodiments disclosed in the present disclosure are applicable.

FIG. 15 illustrates an example of a content streaming system to which embodiments disclosed in the present disclosure may be applied.

Referring to FIG. 15, the content streaming system to which the embodiments of the present disclosure are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, the method comprising:
    deriving reference subblocks on a collocated reference picture for subblocks of a current block;
    deriving motion information for the subblocks of the current block based on motion information for the reference subblocks;
    generating prediction samples based on the motion information for the subblocks of the current block; and
    generating reconstructed samples based on the prediction samples,
    wherein for a reference subblock in which a motion vector is not available among the reference subblocks, base motion information is derived, and
    wherein the base motion information is used as the motion information for a subblock of the current block corresponding to the reference subblock,
    wherein the base motion information is derived based on one of the reference subblocks in a reference block located corresponding to the current block on the collocated reference picture,
    wherein the base motion information is derived based on a first reference subblock having an initially available motion vector, by checking whether a motion vector is available according to a determined order with respect to the reference subblocks in the reference block, and
    wherein, based on the base motion information being not derived, a subblock-based temporal motion vector prediction (sbTMVP) is specified as available.

2. The decoding method of claim 1, wherein the deriving of the reference subblocks comprises;
    deriving a motion vector of a spatial neighboring block of the current block;
    applying a motion shift to a location indicated by the motion vector of the spatial neighboring block at a center sample location of each of the subblocks of the current block; and
    deriving each of the reference subblocks on the collocated reference picture corresponding to the motion-shifted location.

3. The decoding method of claim 1, wherein the base motion information is used motion information derived based on a temporal neighboring block of the current block, and
    the temporal neighboring block includes a reference block of the collocated reference picture corresponding to a bottom-right corner sample location of the current block or a reference block of the collocated reference picture corresponding to a center sample location of the current block.

4. The decoding method of claim 3, wherein the temporal neighboring block is derived by being motion-shifted based on a motion vector derived from a spatial neighboring block of the current block.

5. An image encoding method performed by an encoding apparatus, the method comprising:
    deriving reference subblocks on a collocated reference picture for subblocks of a current block;

deriving motion information for the subblocks of the current block based on motion information for the reference subblocks;

generating prediction samples based on the motion information for the subblocks of the current block;

deriving residual samples based on the prediction samples; and encoding image information including information on the residual samples, wherein for a reference subblock in which a motion vector is not available among the reference subblocks, base motion information is derived, and the base motion information is used as the motion information for a subblock of the current block corresponding to the reference subblock, wherein the base motion information is derived based on one of the reference subblocks in a reference block located corresponding to the current block on the collocated reference picture, wherein the base motion information is derived based on a first reference subblock having an initially available motion vector, by checking whether a motion vector is available according to a determined order with respect to the reference subblocks in the reference block, and wherein, based on the base motion information being not derived, a subblock-based temporal motion vector prediction (sbTMVP) is specified as available.

6. The encoding method of claim 5, wherein the deriving of the reference subblocks comprises;

deriving a motion vector of a spatial neighboring block of the current block;

applying a motion shift to a location indicated by the motion vector of the spatial neighboring block at a center sample location of each of the subblocks of the current block; and deriving each of the reference subblocks on the collocated reference picture corresponding to the motion-shifted location.

7. The encoding method of claim 5, wherein the base motion information is used motion information derived based on a temporal neighboring block of the current block, and the temporal neighboring block includes a reference block of the collocated reference picture corresponding to a bottom-right corner sample location of the current block or a reference block of the collocated reference picture corresponding to a center sample location of the current block.

8. The encoding method of claim 7, wherein the temporal neighboring block is derived by being motion-shifted based on a motion vector derived from a spatial neighboring block of the current block.

9. A non-transitory computer-readable storage medium storing encoded information causing an image decoding apparatus to perform an image decoding method, wherein the decoding method comprises:

deriving reference subblocks on a collocated reference picture for subblocks of a current block;

deriving motion information for the subblocks of the current block based on motion information for the reference subblocks;

generating prediction samples based on the motion information for the subblocks of the current block; and generating reconstructed samples based on the prediction samples, wherein for a reference subblock in which a motion vector is not available among the reference subblocks, base motion information is derived, and the base motion information is used as the motion information for a subblock of the current block corresponding to the reference subblock, wherein the base motion information is derived based on one of the reference subblocks in a reference block located corresponding to the current block on the collocated reference picture, wherein the base motion information is derived based on a first reference subblock having an initially available motion vector, by checking whether a motion vector is available according to a determined order with respect to the reference subblocks in the reference block, and wherein, based on the base motion information being not derived, a subblock-based temporal motion vector prediction (sbTMVP) is specified as available.

* * * * *